(12) United States Patent
Aoyagi

(10) Patent No.: US 10,768,846 B2
(45) Date of Patent: Sep. 8, 2020

(54) INFORMATION PROCESSING APPARATUS AND CONTROL METHOD OF INFORMATION PROCESSING APPARATUS

(71) Applicant: CANON KABUSHIKI KAISHA, Tokyo (JP)

(72) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 16/255,447

(22) Filed: Jan. 23, 2019

(65) Prior Publication Data

US 2019/0235783 A1  Aug. 1, 2019

(30) Foreign Application Priority Data

Jan. 26, 2018 (JP) ................................ 2018-011648

(51) Int. Cl.
*G06F 3/06* (2006.01)
(52) U.S. Cl.
CPC ............ *G06F 3/0646* (2013.01); *G06F 3/061* (2013.01); *G06F 3/0673* (2013.01); *G06F 3/067* (2013.01)
(58) Field of Classification Search
None
See application file for complete search history.

(56) References Cited

U.S. PATENT DOCUMENTS

2012/0297181 A1* 11/2012 Lee .................. G06F 9/4401
  713/2
2015/0089182 A1* 3/2015 Singh .................. G06F 3/061
  711/173

FOREIGN PATENT DOCUMENTS

JP          5-298030 A      11/1993

* cited by examiner

*Primary Examiner* — Brian R Peugh
(74) *Attorney, Agent, or Firm* — Canon U.S.A., Inc. IP Division

(57) ABSTRACT

An information processing apparatus includes: a controller that controls a plurality of storage devices and transmits and receives data to and from the plurality of storage devices; and a bridge that communicates with the controller via a predetermined interface, communicates with each of the plurality of storage devices via each of a plurality of predetermined interfaces, and bridges the communications between the controller and the plurality of storage devices. The controller acquires information of a master boot record from each of the plurality of storage devices, and generates information of a master boot record in a virtual storage device to provide the plurality of storage devices as one storage device. The bridge controls a process for writing the information of the master boot record in the virtual storage device into a region of a master boot record in a first storage device out of the plurality of storage devices.

8 Claims, 16 Drawing Sheets

INFORMATION PROCESSING APPARATUS AND CONTROL METHOD OF INFORMATION PROCESSING APPARATUS

BACKGROUND

Field of the Disclosure

The present disclosure generally relates to information processing and, more particularly, to an information processing apparatus and a control method of an information processing apparatus.

Description of the Related Art

In recent years, hard disk drives (HDDs) and solid state drives (SSDs) have been increasingly used not only as storage devices in computers but also as data storage devices in electronic devices such as HDD recorders and multi/function printers (MFPs). In addition, storage devices have been being increased in storage capacity to store large amounts of image data and moving picture data.

Accordingly, when an HDD connected in the default state is lacking of capacity, a plurality of HDDs is added.

In addition, an SSD is added separately from a large-capacity HDD to enable high-speed access so that the SSD and the HDD can be used for different purposes such as the SSD for access to data in a shorter time and the HDD for data passing that may be accessed without problem even if data access time becomes longer. These HDD and SSD are connected under standards generally called Serial Advanced Technology Attachment (SATA). The connection is controlled by a central processing unit (CPU) according to a protocol determined by the standards.

Each of HDDs in computers and various electronic devices is accessed by a controller under control of the CPU. Development of an operating system (OS) as software operating the CPU and software such as a driver controlling a controller and an HDD under the OS takes very large amounts of time and cost. In addition, there is a high risk of malfunction and the like caused by bugs.

Accordingly, a general-purpose OS such as Windows has been used in various electric devices as well as computers to control the CPU in recent years. Further, a general-purpose driver has been increasingly used for basic operations in an SATA driver controlling a controller and an HDD.

Although there is only one SATA interface (I/F) from a controller, a complicatedly configured system is used with a plurality of HDDs connected via an SATA-SATA bridge and cannot be supported by a general-purpose OS and a general-purpose driver.

As a conventional technique, Japanese Patent Laid-Open No. 5-298030 proposes a technique as described below. Japanese Patent Laid-Open No. 5-298030 describes that a plurality of drives is given an identical logical drive name and the sum total of drive capacities under the identical name is set as capacities of the logical drives and information on these drives is described in a setting file to be read at the time of power-on, whereby the plurality of drives is treated as one drive.

SUMMARY

According to one or more aspects of the disclosure, an information processing apparatus includes: a controller that controls a plurality of storage devices and transmits and receives data to and from the plurality of storage devices; and a bridge that communicates with the controller via a predetermined interface, communicates with each of the plurality of storage devices via each of a plurality of predetermined interfaces, and bridges the communications between the controller and the plurality of storage devices. The controller acquires information of a master boot record from each of the plurality of storage devices, and generates information of a master boot record in a virtual storage device to provide the plurality of storage devices as one storage device. The bridge controls a process for writing the information of the master boot record in the virtual storage device into a region of a master boot record in a first storage device out of the plurality of storage devices.

Further features of the present disclosure will become apparent from the following description of exemplary embodiments (with reference to the attached drawings).

DESCRIPTION OF THE EMBODIMENTS

Various exemplary embodiments, features, and aspects of the present disclosure will be described with reference of the drawings.

First Embodiment

Descriptions will be given as to processing for performing access control while a plurality of HDDs is recognized as one virtual drive by a general-purpose OS.

Figure 1:
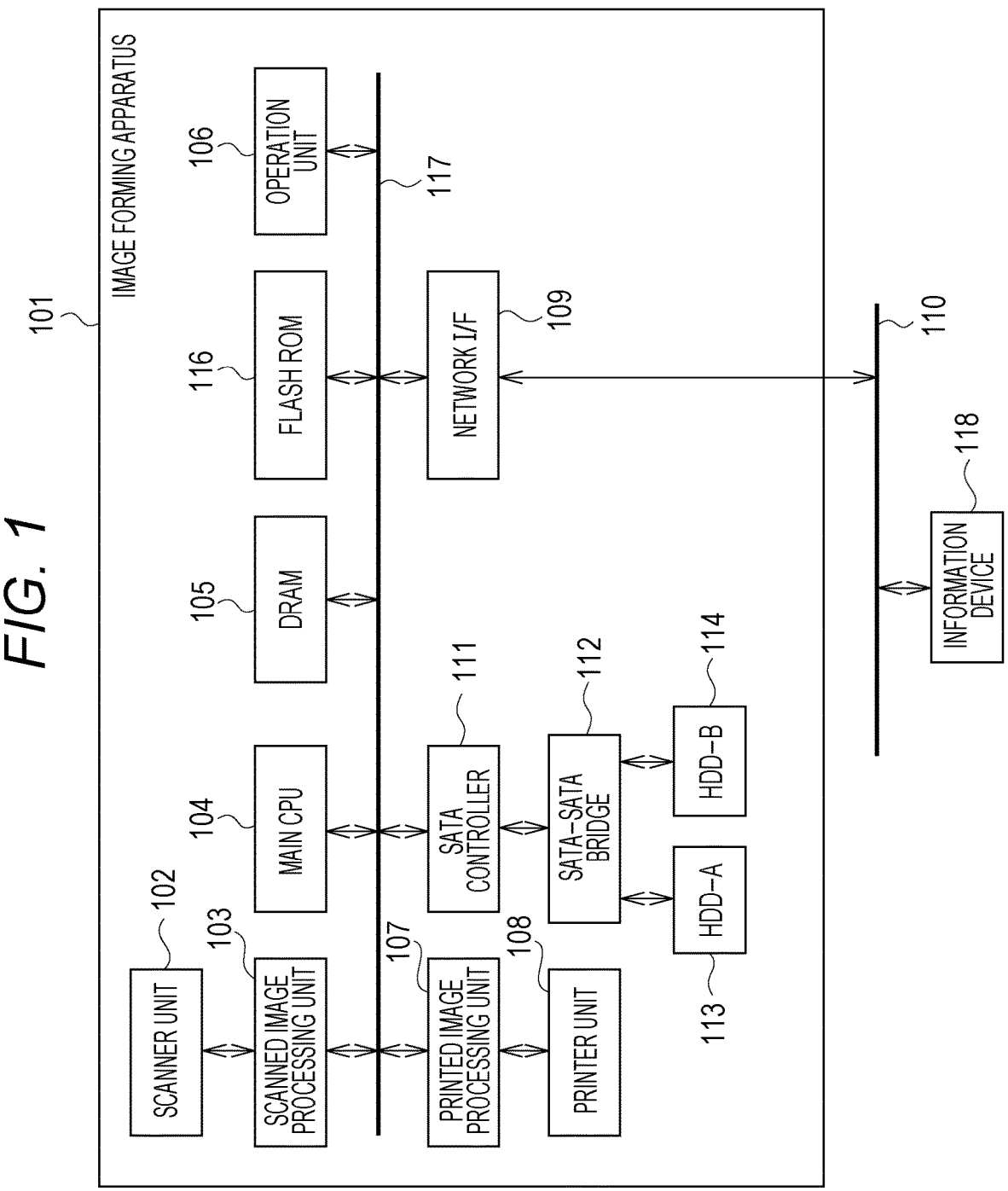
FIG. 1 is a diagram illustrating an example of a hardware configuration of an image forming apparatus.

FIG. 1 is a diagram illustrating an example of a hardware configuration of an image forming apparatus 101. The image forming apparatus 101 performs image processing on image data input from a scanner unit 102 or a network I/F 109 and then prints the image data on paper from a printer unit 108 and outputs the same. The image forming apparatus 101 also performs a function of performing image processing on the image data input from the scanner unit 102 and transmitting the same from the network I/F 109 to an information device 118. The image forming apparatus 101 is an example of an information processing apparatus.

The scanner unit 102 optically reads image information on paper and converts the same into image data of an electric signal, and then transmits the same to a scanned image processing unit 103. The scanned image processing unit 103 performs image processing on the image data received from the scanner unit 102 and transmits the same to an SATA controller 111. A main central processing unit (CPU) 104, which may include one or more processors, one or more memories, circuitry, or a combination thereof, may control the entire image forming apparatus 101. A dynamic random access memory (DRAM) 105 stores programs to be executed by the main CPU 104 and is used as a work area for temporary data.

An operation unit 106 provides information on the image forming apparatus 101 to a user and accepts operations from the user.

A printed image processing unit 107 performs image processing on the received image data and transmits the same to the printer unit 108. The printer unit 108 prints the image data received from the printed image processing unit 107 on paper and outputs the same.

The network I/F 109 is an interface that communicates with an information device 118 via a local area network (LAN) 110. The LAN 110 is a communication network for communications between the image forming apparatus 101 and the information device 118. In this case, the physical connection form of the LAN 110 such as wired or wireless mode is no object.

An SATA controller 111 controls peripheral devices in conformity with the Serial ATA (SATA) standards and transmits and receives data to and from the peripheral devices. An SATA-SATA bridge 112 allows communications between the SATA controller 111 and the HDD-A 113, and between the SATA controller 111 and HDD-B 114. The SATA controller 111 is an example of controller that communicates with the SATA controller 111 by one SATA I/F and communicates with the plurality of storage devices (HDD-A and HDD-B) by a plurality of SATA I/Fs to act as a bridge between the SATA controller 111 and the plurality of storage devices.

The HDD-A 113 and the HDD-B 114 record or delete data to and from an internal recording medium, and reads data from the internal recording medium according to instructions from the SATA-SATA bridge 112 having received an SATA command from the SATA controller 111.

A FLASH ROM 116 stores programs to be executed by the main CPU 104 and setting information. The individual components are connected to a main bus 117 as illustrated in FIG. 1 so that data is delivered between the individual components via the main bus 117. The information device 118 communicates with the image forming apparatus 101 via the LAN 110 to transmit a print job and receive a scanned image from the image forming apparatus 101.

The main CPU 104 executes processing based on programs stored in the DRAM 105 or the FLASH ROM 116 to implement the functions of the image forming apparatus 101. In addition, the main CPU 104 executes processing based on the programs stored in the DRAM 105 or the FLASH ROM 116 to implement processes to be executed by the main CPU 104 out of the processes described in the flowcharts of FIGS. 12 to 17 described later.

Next, detailed descriptions will be given as to the inside of the SATA-SATA bridge 112 and the SATA controller 111 with reference to FIG. 2.

A CPU-B 204 controls the entire SATA-SATA bridge 112.

An SATA device I/F unit 201 acts as a peripheral device in conformity with the SATA standards and communicates with an SATA host I/F unit-C 209 as a host in conformity with the SATA standards in the SATA controller 111. An SATA host I/F unit-A 202 controls saving, deletion, reading, and others of data in and from the HDD-A 113 in conformity with the SATA standards via an A host I/F 214 according to a command control from a CPU-B 204.

The SATA host I/F unit-B 203 controls saving, deletion, reading, and others of data in and from the HDD-B 114 in conformity with the SATA standards via the B host I/F 215 according to command control from the CPU-B 204.

The DRAM 206 saves programs to be executed by the CPU-B 204 and is used as a work area of temporary data.

The FLASH memory-B 207 stores the programs to be executed by the CPU-B 204 and the setting information. In the present embodiment, the FLASH memory-B 207 stores various kinds of SATA I/F driver software in the SATA-SATA bridge 112, operation mode settings on the operation mode in which the system will start to operate at the time of power-on and rebooting, partition conversion information, and address conversion information.

As for the operation mode settings, a single mode is set when only one HDD drive is connected to the SATA-SATA bridge 112, and a virtual drive mode is set when a plurality of HDDs is connected to the SATA-SATA bridge 112, and the single mode is set in the initial state.

In the SATA system according to the present embodiment, all the plurality of drives connected to the SATA-SATA bridge 112 are collectively recognized as one virtual drive by the OS to make an HDD access for data read, data write, and others.

The function of the SATA-SATA bridge 112 is implemented by the CPU-B 204 executing processing based on the programs stored in the DRAM 206 or the FLASH memory-B 207. In addition, out of the processes described in the flowcharts of FIGS. 12 to 17, the process to be executed by the CPU-B 204 is implemented by the CPU-B 204 executing processing based on the programs stored in the DRAM 206 or the FLASH memory-B 207.

Next, basic configuration of the inside of the SATA controller 111 will be described. The SATA host I/F unit-C 209 acts as a host in conformity with the SATA standards to communicate with the SATA device I/F unit 201 in conformity with the SATA standards in the SATA-SATA bridge 112 via the C host I/F 213.

The CPU-C 210 controls the entire SATA controller 111. The FLASH ROM-C 211 stores the programs to be executed by the CPU-C 210 and the setting information. Reference sign 212 represents a bus bridge circuit that controls communications with the SATA controller 111 and the main CPU 104 via the main bus 117.

Figure 2:
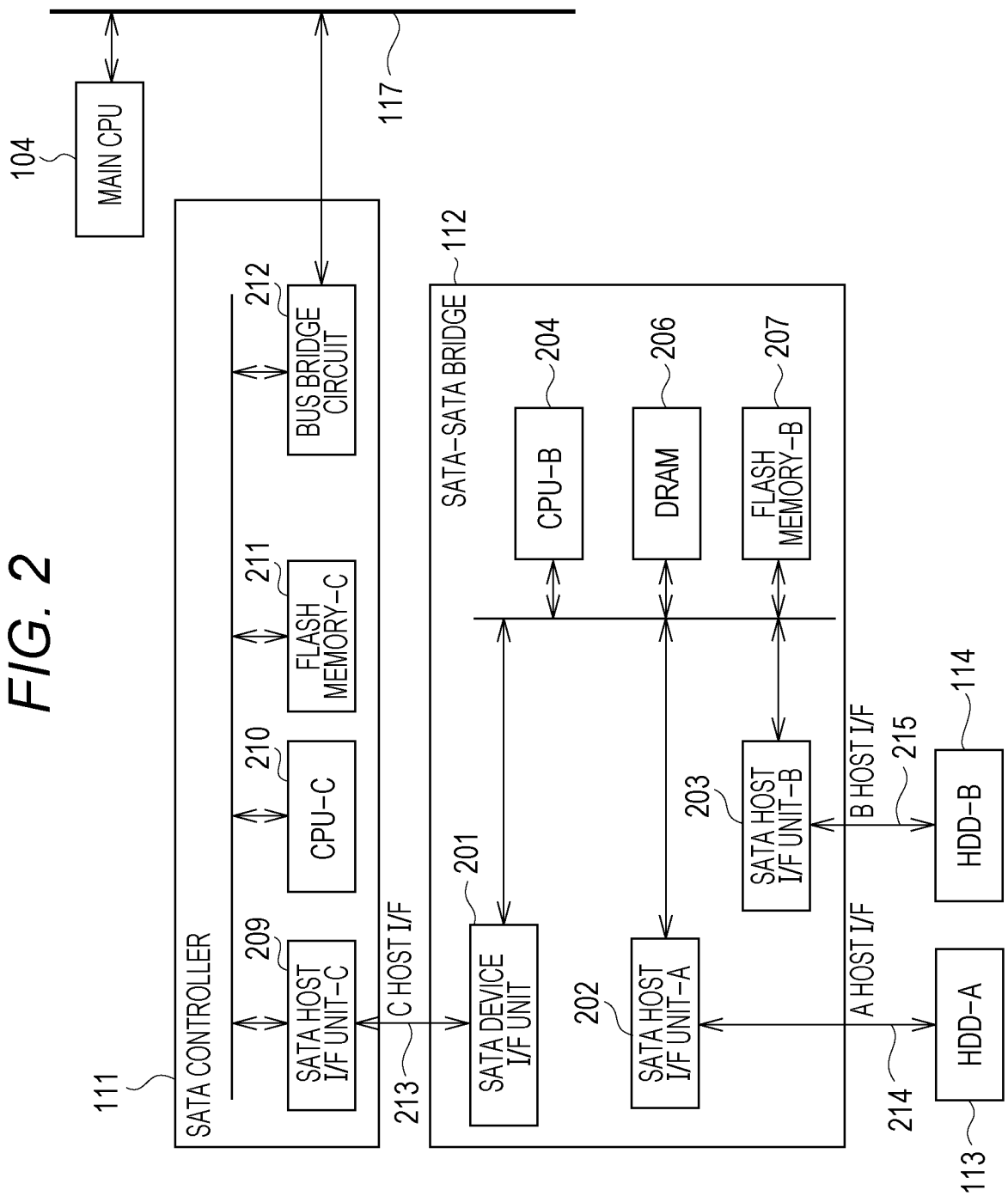
FIG. 2 is a diagram illustrating in detail an SATA-SATA bridge and an SATA controller.

Referring to FIG. 2, the I/F between the SATA host I/F unit-C 209 and the SATA device I/F unit 201 is set as a C host I/F 213. In addition, the I/F between the SATA host I/F unit-A 202 and the HDD-A 113 is set as A host I/F 214, and the I/F between the SATA host I/F unit-B 203 and the HDD-B 114 as B host I/F 215.

The function of the SATA controller 111 is implemented by the CPU-C 210 executing processing based on the programs stored in the FLASH ROM-C 211. In addition, out of the processes described in the flowcharts of FIGS. 12 to 17 described later, the process to be executed by the CPU-C 210 is implemented by the CPU-C 210 executing processing based on the programs stored in the FLASH ROM-C 211.

Next, operations for storing the image data scanned by the scanner unit 102 in the HDD-A 113 will be described with reference to FIG. 3.

Figure 3:
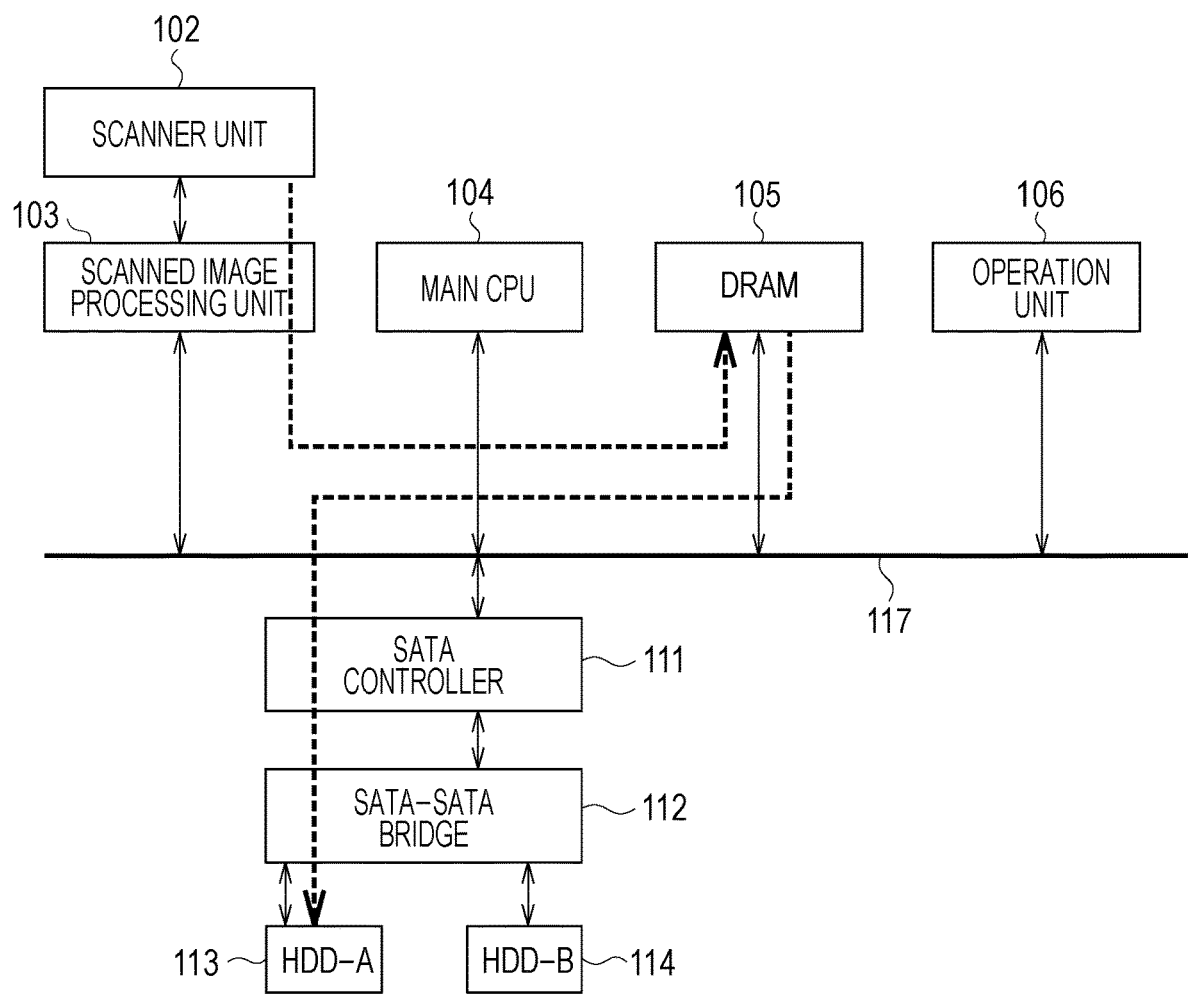
FIG. 3 is a diagram illustrating an operation for storing scanned image data into an HDD-A.

FIG. 3 illustrates a selection of components from FIG. 1 related to the operations for storing the image data scanned by the scanner unit 102 in the HDD-A 113.

The user makes an operation setting for the image forming apparatus 101 by the operation unit 106.

The setting in this case is a setting for scanning image data of original documents by the scanner unit 102, performing predetermined image processing, and then storing the image data in the HDD.

When the setting is made via the operation unit 106 and an instruction on execution is given, the main CPU 104 controls the components according to the setting.

First, the scanner unit 102 reads image data. The read image data is output to the scanned image processing unit 103. Scanned image processing unit can be implemented by one or more circuitry (application specific integrated circuit (ASIC)) or one or more hardware processor controlled by a program module.

The scanned image processing unit 103 performs pixel processing on the input image data according to the setting value from the main CPU 104 having received the user setting from the operation unit 106.

The image data having been processed by the scanned image processing unit 103 is stored in the DRAM 105 via the main bus 117.

In the present embodiment, the image data is stored in the HDD, and thus the stored data is output to the SATA controller 111 via the main bus 117. However, when a plurality of prints is to be produced by the printer unit 108, the image data in the memory is repeatedly output by the number of prints.

The image data having been input into the SATA controller 111 is sent to the SATA-SATA bridge 112 via the C host I/F 213 according to the SATA protocol.

In the SATA-SATA bridge 112, the input image data is stored in the HDD-A 113 or the HDD-B 114 according to the protocol of the SATA interface.

In the present embodiment, the image data is stored in the HDD-A.

To cause the main CPU 104 to perform these operations, data of an OS to be used at the start of the SATA system in the present embodiment after the power-on and SATA drivers for controlling the SATA controller 111 from the main CPU 104 are stored in the FLASH ROM 116.

In the present embodiment, a general-purpose OS is used for controlling the main CPU 104, and a general-purpose SATA driver is used for controlling SATA I/Fs under the SATA controller from the main CPU 104 on the general-purpose OS.

To execute unique operations of the SATA system in the present embodiment that would be incapable of being implemented by the general-purpose SATA driver, a unique SATA driver is prepared separately from the general-purpose driver.

In addition to unique SATA standard commands, extended commands for the SATA system in the present embodiment to execute unique operations are used as well.

The extended commands are to be executed by the unique SATA driver and are stored in the FLASH ROM 116 together with the general-purpose driver.

The units described throughout the present disclosure are exemplary and/or preferable modules for implementing processes described in the present disclosure. The modules corresponding to the units are generally be hardware units (such as circuitry, firmware, a field programmable gate array, a digital signal processor, an application specific integrated circuit, an operation panel device or the like) and/or software modules (such as a computer readable program or the like).

Next, an internal configuration of the HDD-A 113 will be described with reference to FIG. 4.

Figure 4:
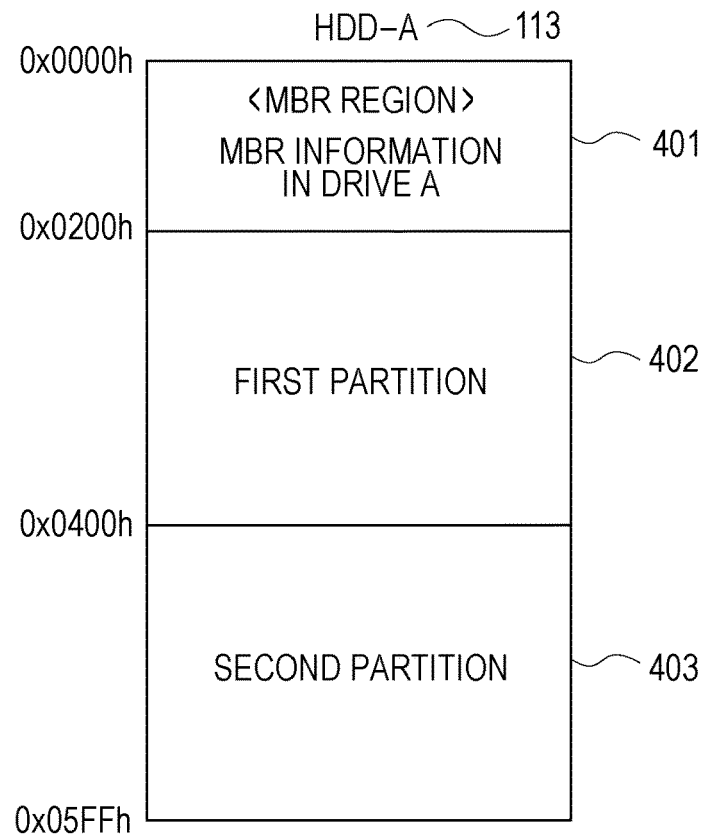
FIG. 4 is a diagram illustrating an example of an internal configuration of the HDD-A.

The internal configuration of the HDD-A 113 is as illustrated in FIG. 4, as with the configuration of a general HDD.

At the leading address of the HDD, an MBR region 401 is provided. Stored in the MBR region 401 are hard disk partition information, boot codes for reading system files (Initial Program Loader (IPL)), and file system information used in this HDD.

The MBR information stored in the MBR region 401 includes information into how many regions the HDD is divided and from what address to what address the regions range. The MBR information is an example of information on master boot records.

In the example of FIG. 4, in the HDD-A 113, the first partition ranges from address 0x0200h to address 0x03FFh, and the second partition ranges from address 0x0400h to address 0x05FFh.

Figure 5:
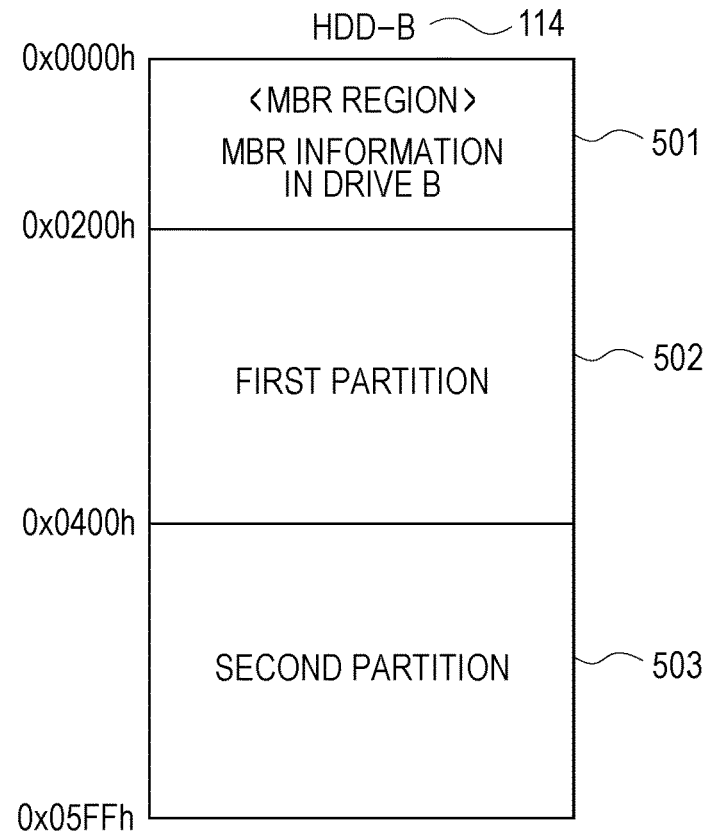
FIG. 5 is a diagram illustrating an example of an internal configuration of an HDD-B.

The internal configuration of the HDD-B 114 is as illustrated in FIG. 5 as with the HDD-A 113 and thus detailed descriptions thereof will be omitted.

Hereinafter, operations for causing the two drives HDD-A 113 and HDD-B 114 to be treated as one virtual drive by the general-purpose OS at the time of power-on as a feature of the present embodiment will be described with reference to FIGS. 6 to 17.

Figure 6:
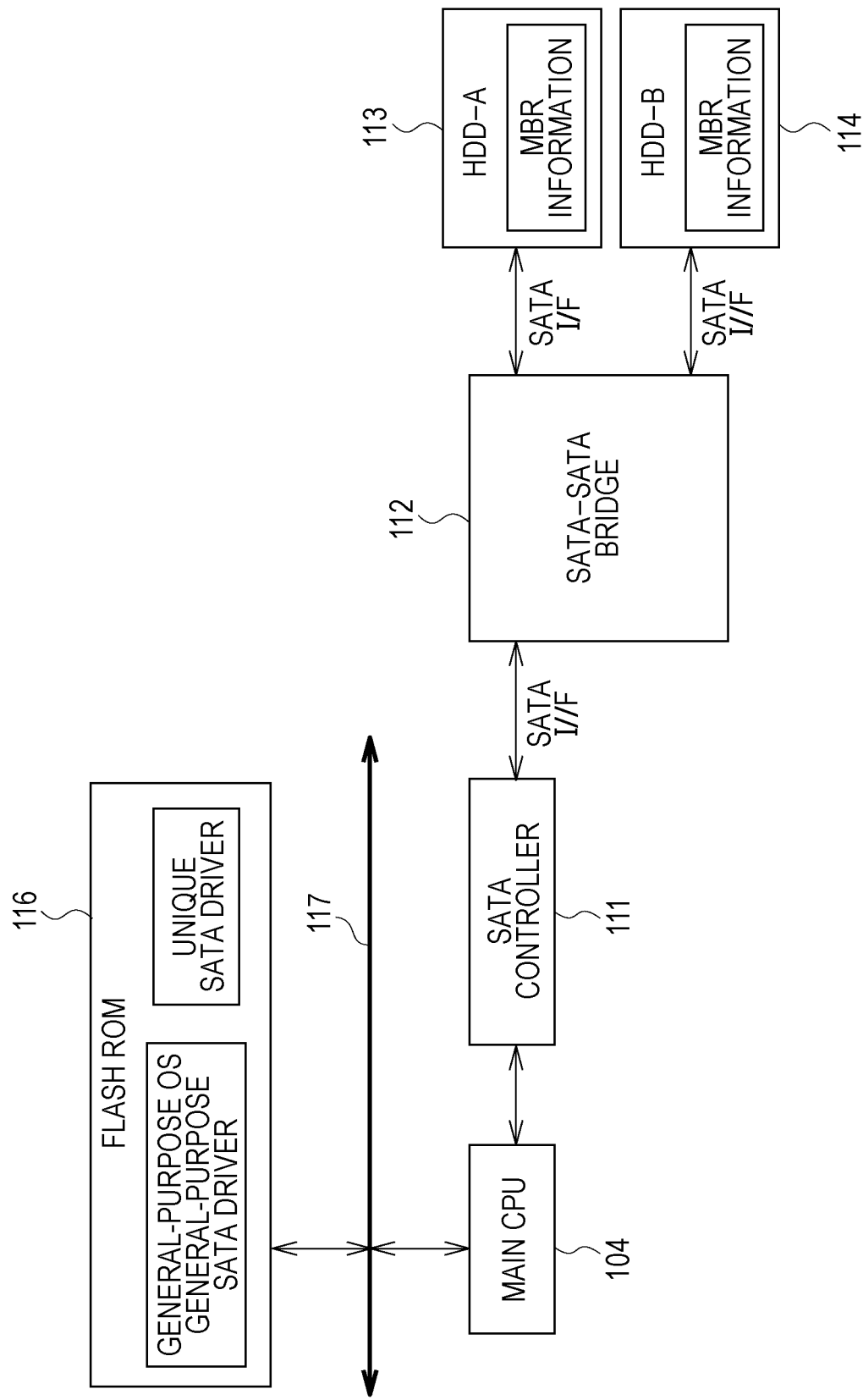
FIG. 6 is a diagram illustrating an example of an SATA system.

FIG. 6 illustrates an example of the SATA system in the present embodiment in which components related to the operations for causing the two drives to be treated as one virtual drive by the general-purpose OS as a feature of the present embodiment are selected from FIGS. 1, 2, 4, and 5.

The components illustrated in FIG. 6 have been already described above with reference to FIGS. 1 and 2 and thus detailed descriptions thereof will be omitted here.

In the configuration illustrated in FIG. 6, to cause the two drives to be treated as one virtual drive by the general-purpose OS, the components are controlled in the following three steps:

S1 is a control at the first power-on after making a connection to the configuration illustrated in FIG. 6.

After the power-on of the main CPU 104, the SATA system in the present embodiment is started in a state in which data passing to and from the HDD-A 113 becomes enabled under control of the general-purpose OS and the general-purpose SATA driver.

In S2, upon completion of S1, the main CPU 104 controls the SATA controller 111 and the SATA-SATA bridge 112 to generate and store information in a virtual drive to be used at the next and subsequent times of startup under control of the unique SATA driver in the SATA system.

After the completion of S2, the main CPU 104 reboots the main CPU 104 and the SATA system in the present embodiment.

In S3 after the rebooting, based on the information in the virtual drive generated in S2, the main CPU 104 generates access information to the HDD under control of the general-purpose OS. Accordingly, data passing to and from the HDD-A 113 and the HDD-B 114 becomes enabled without making changes to the software of the general-purpose OS.

Figure 7:
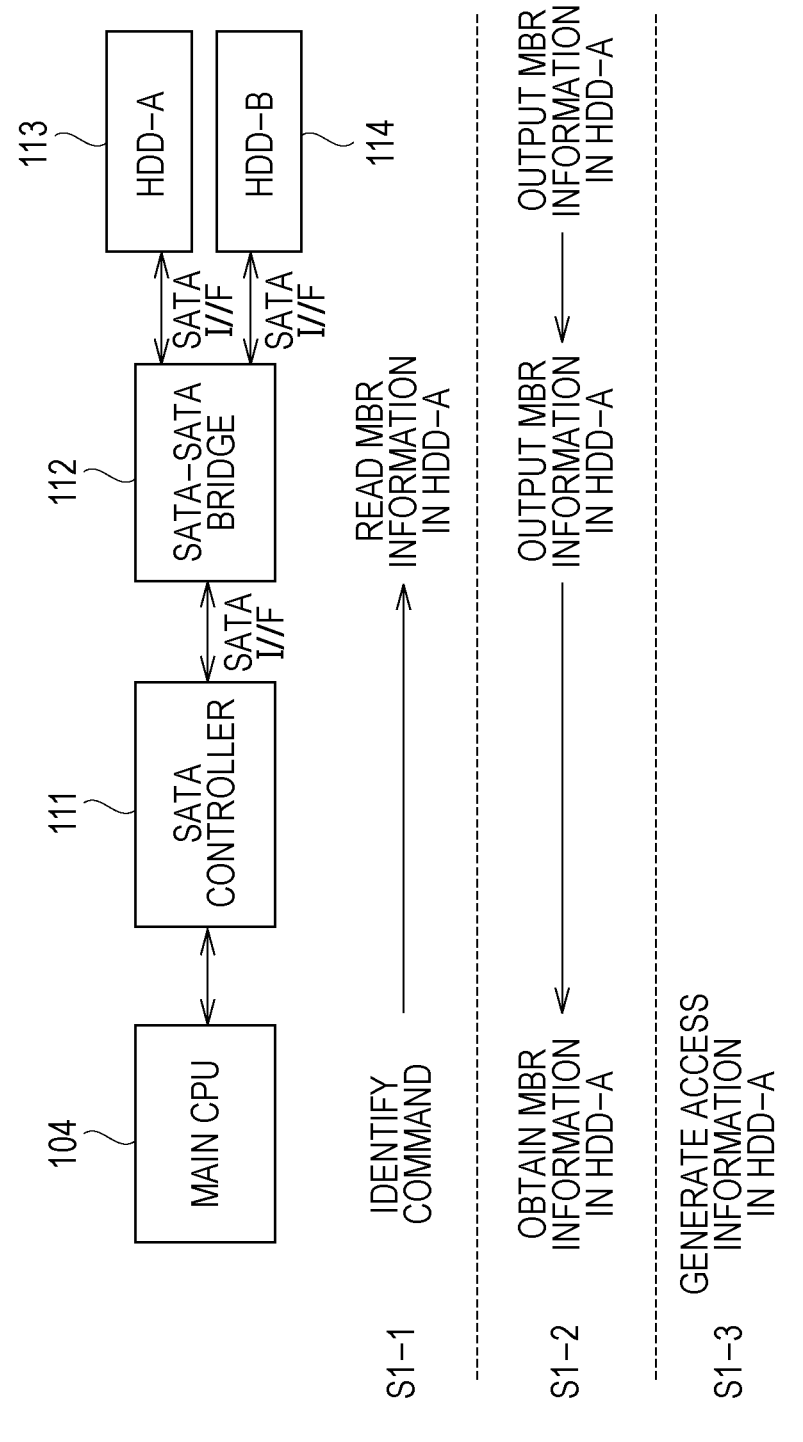
FIG. 7 is a diagram for describing data passing in S1.

The data passing in S1 will be described with reference to FIG. 7.

S1 represents a control at the first power-on after connection to the configuration illustrated in FIG. 6, and after the power-on, the main CPU 104 is started in the state in which data passing to and from the HDD-A 113 is enabled.

Hereinafter, S1 will be described in detail.

When the SATA system in the present embodiment is powered on, the general-purpose OS to control the main CPU 104 is read from the FLASH ROM 116 to boot up the main CPU 104.

At this time, the CPU-B 204 in the SATA-SATA bridge 112 checks the mode information in the FLASH memory-B 207 to recognize that operations will be performed in the single drive mode as initial setting.

After that, when having recognized that the SATA I/F will be used, the main CPU 104 first outputs an SATA standard command called identify command under control of the general-purpose OS.

The identify command is a command for the general-purpose OS to obtain information in the drive connected to the SATA I/F. The identify command is input into the SATA-SATA bridge 112 via the SATA controller.

In S1-1, upon receipt of the identify command, the CPU-B 204 in the SATA-SATA bridge 112 reads information from the MBR region 401 of the HDD-A 113.

In S1-2, the information in the MBR region 401 of the HDD-A 113 is output from the HDD-A 113 and read into the SATA-SATA bridge 112. Then, the information in the MBR region 401 of the HDD-A 113 is input into the main CPU 104 via the SATA controller 111.

In S1-3, upon receipt of the information in the MBR region 401 of the HDD-A 113 under control of the general-purpose OS, the main CPU 104 selects the file system to be used and generates access information for transmitting and receiving data to and from the partitions in the HDD-A 113 based on the information. Upon completion of generation of the access information, transmission and reception of data between the main CPU 104 and the HDD-A 113 becomes enabled.

At this time, in the SATA system in the present embodiment, the general-purpose OS for operating the main CPU 104 runs on the assumption that the general-purpose OS is formed from the only one SATA host controller, and thus the general-purpose OS runs regardless of the connection of the HDD-B 114, and does not obtain information in an MBR region 501 of the HDD-B 114.

Accordingly, at this point in time, transmission and reception of data between the main CPU 104 and the HDD-A 113 is enabled but transmission and reception of data between the main CPU 104 and the HDD-B 114 is not enabled.

Figure 8:
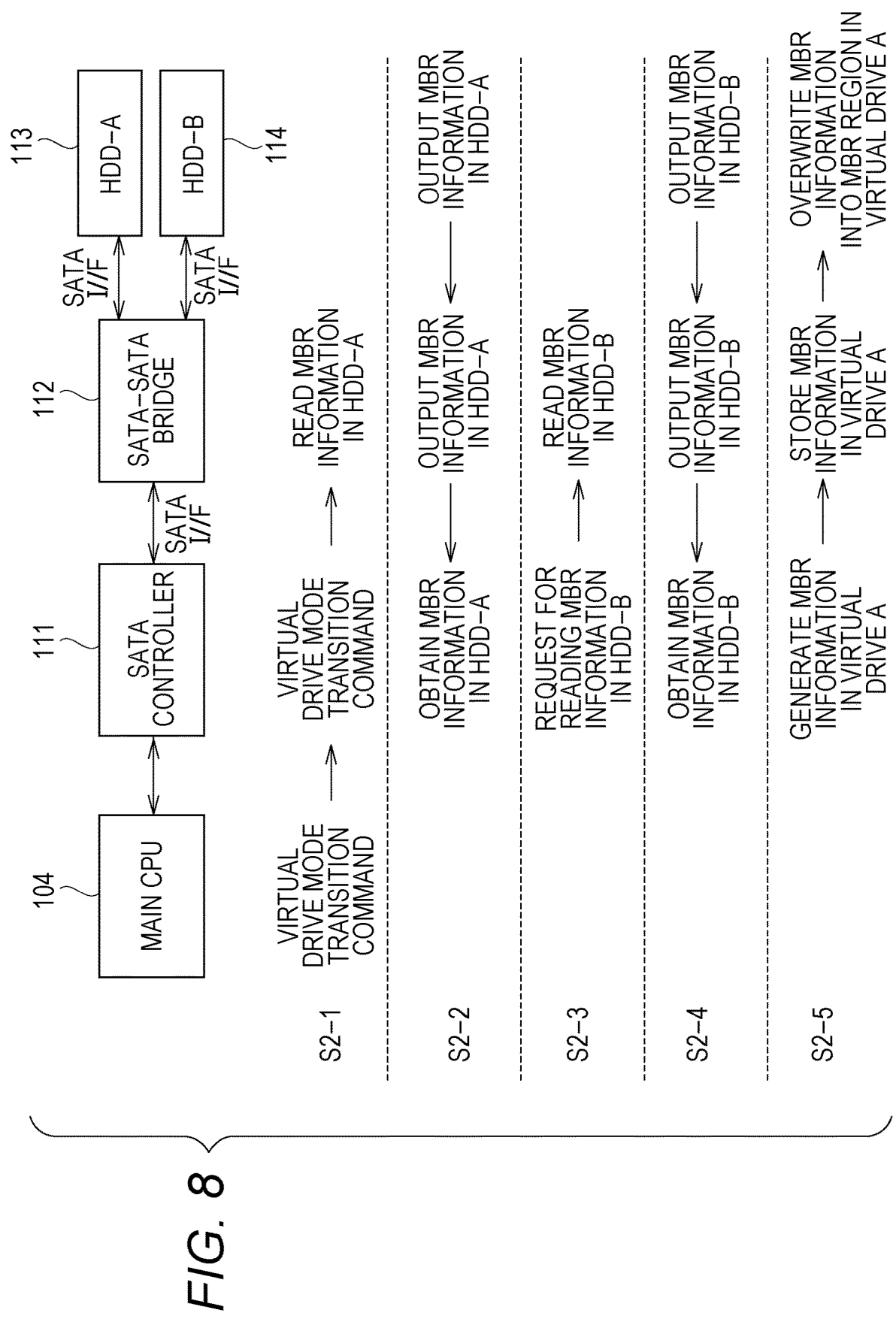
FIG. 8 is a diagram for describing data passing in S2.

Next, data passing in S2 will be described with reference to FIG. 8.

In S2, upon completion of S1, the SATA controller 111 and the SATA-SATA bridge 112 are controlled to generate and store information in a virtual drive to be used at the next and subsequent times of startup.

Hereinafter, S2 will be described in detail.

Due to the execution of S1, transmission and reception of data between the main CPU 104 and the HDD-B 114 is not enabled but command passing among the main CPU 104, the SATA controller 111, and the SATA-SATA bridge 112 is enabled.

In this state, for the main CPU 104 to operate the unique SATA driver, a unique extended command in the SATA system in the present embodiment called virtual drive mode transition command is output from the main CPU 104.

The CPU-C 210 in the SATA controller 111 obtains information in the MBR regions of both the HDD-A 113 and the HDD-B 114 via the SATA-SATA bridge 112 according to the virtual drive mode transition command, and generates and stores information in the virtual drive to be used at the next and subsequent times of startup.

In S2-1, upon receipt of the virtual drive mode transition command from the main CPU 104, the CPU-B 204 in the SATA controller 111 first obtains information in the MBR region (MBR information) of the HDD-A 113 via the SATA-SATA bridge 112 as with the time of normal startup.

In S2-2, the information in the MBR region 401 (MBR information) of the HDD-A 113 is output from the HDD-A 113 and read into the SATA-SATA bridge 112. Then, the MBR information is output from the SATA-SATA bridge 112 and input into the SATA controller 111.

In S2-3, the CPU-B 204 in the SATA controller 111 outputs a request for reading the information in the MBR region of the HDD-B 114 via the SATA-SATA bridge 112.

In S2-4, the information in the MBR region 501 (MBR information) of the HDD-B 114 is output from the HDD-B 114 and read into the SATA-SATA bridge 112. Then, the MBR information is output from the SATA-SATA bridge 112 and input into the SATA controller 111. S2-4 is an example of processing by the SATA controller 111 to acquire the MBR information from each of the plurality of storage devices.

In S2-5, the CPU-B 204 in the SATA controller 111 generates MBR information for the two drives to be recognized as one virtual drive by the general-purpose OS based on the MBR information in the HDD-A 113 and the MBR information in the HDD-B 114. After that, the MBR information in the virtual drive A generated by the SATA controller 111 is stored in the MBR region of the HDD-A 113 via the SATA-SATA bridge 112.

Figure 9:
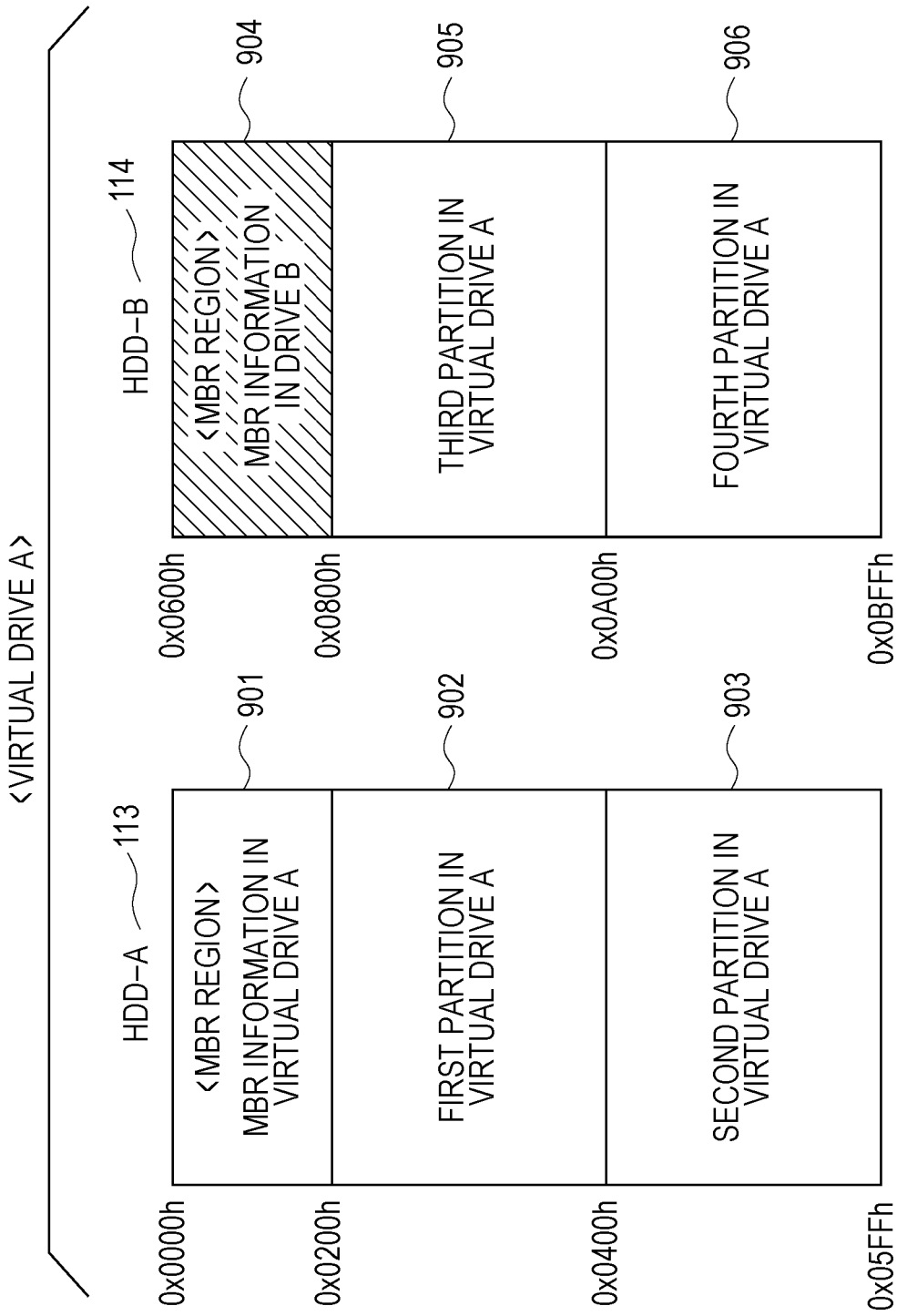
FIG. 9 is a diagram illustrating a configuration of a virtual drive A (No. 1).

FIG. 9 is a diagram illustrating a configuration of the virtual drive A generated by the SATA controller 111 from the configuration of the HDD-A 113 illustrated in FIG. 4 and the configuration of the HDD-B 114 illustrated in FIG. 5.

The disk capacity of the virtual drive A is the sum total of the capacities of the HDD-A 113 and the HDD-B 114 and has addresses of 0x0000h to 0x0BFFh.

For the partitions of the virtual drive A, a first partition 902 and a second partition 903 are set on the HDD-A 113 side in the same state as illustrated in FIG. 4. On the other hand, the partitions on the HDD-B 114 side are treated as the partitions of the virtual drive A even if the capacities are the same, and the first partition corresponds to a third partition 905 and has addresses 0x0800h to 0x09FFh. In addition, the second partition corresponds to a fourth partition 906 and has addresses replaced by 0x0A00h to 0x0BFFh.

The MBR information in the virtual drive A generated by the SATA controller 111 is stored in the MBR region 901 at the start address 0x0000h to 0x0200h in the virtual drive A.

That is, the MBR information in the virtual drive A is stored by overwriting the MBR information originally stored in the HDD-A 113.

In the general-purpose OS, the virtual drive A is treated as one drive and thus the MBR information needs to be stored only in the MBR region 901.

Accordingly, the portion as the original MBR region in the HDD-B114 corresponds to the region in the virtual drive A at addresses 0x0600h to 0x07FFh and there is no need to store the disk information in the region.

Accordingly, in the present embodiment, the region in the virtual drive A at addresses 0x0600h to 0x07FFh is set to an unused region.

After the MBR information in the virtual drive A is stored in the MBR region 901 in the virtual drive A at the start addresses 0x0000h to 0x0200h, when the system is powered on next time or when the SATA system in the present embodiment is rebooted, information indicating that operations will be performed in the virtual device mode is stored in the FLASH memory-B 207 in the SATA-SATA bridge 112.

In addition, at this time, in S3, the partition conversion information and the address conversion information are stored in the FLASH memory-B 207 so that the main CPU 104 can convert access information for making access to the partitions on the HDD-B 114 side.

For example, upon reception of a command for data write to the third partition 905 at the address 0x0800h on the HDD-B 114 side from the SATA controller 111, the SATA-SATA bridge 112 performs a conversion into the first partition at the address 0x0200h in the HDD-B 114 and stores the data in the HDD-B 114.

Accordingly, S2 is completed.

In the present embodiment, the region in the virtual drive A at the addresses 0x0600h to 0x07FFh is set as unused region. However, as another method for setting partitions, the region may be included in the third partition and used as a data storage region.

Figure 10:
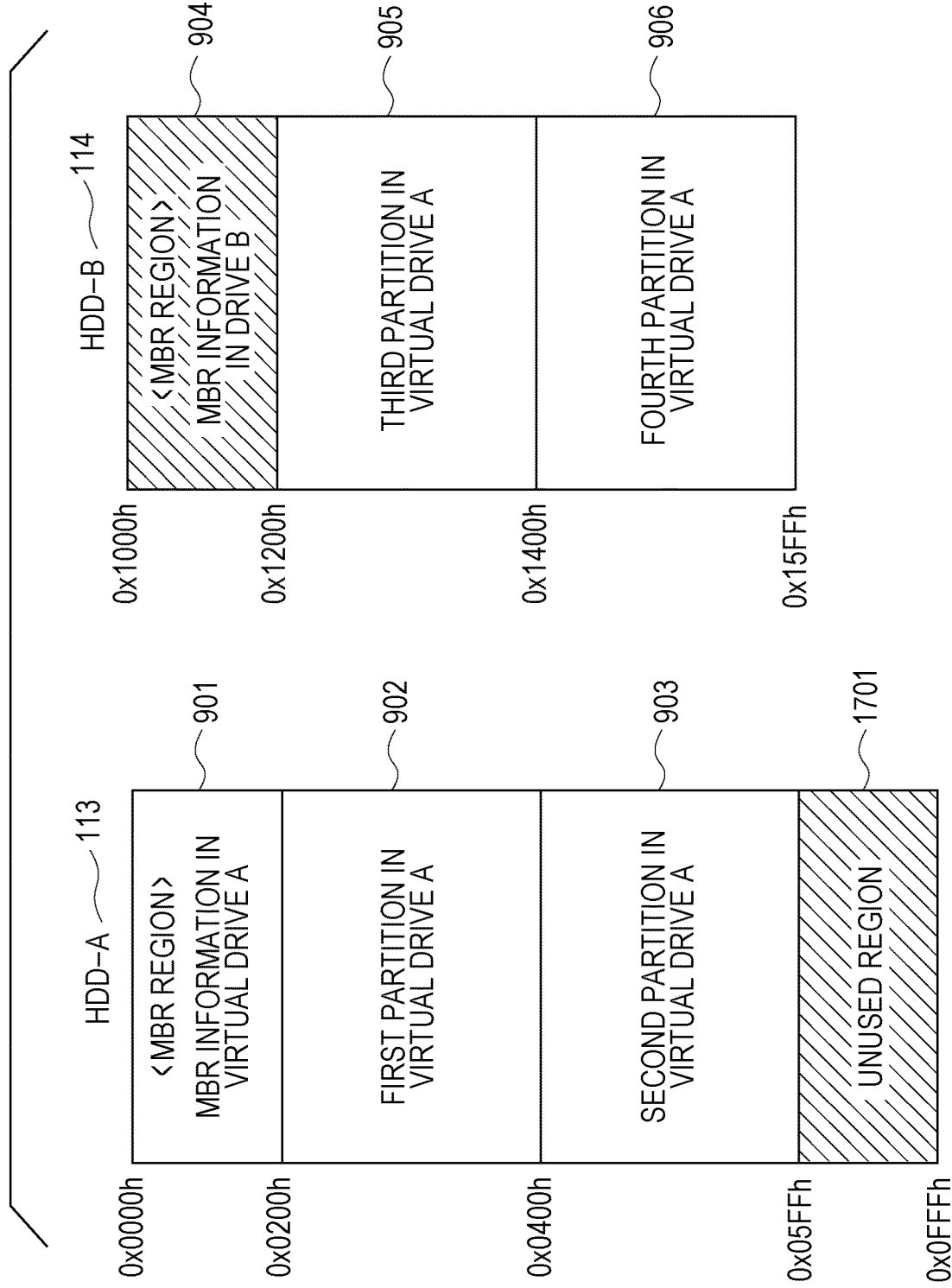
FIG. 10 is a diagram illustrating a configuration of the virtual drive A (No. 2).

In the present embodiment, as logical addresses of the HDD-A 113 and the HDD-B 114, the logical addresses in the virtual drive A are set up to 0x0BFFh. However, as illustrated in FIG. 10, by setting an unused region 1701 between the logical addresses of the HDD-A 113 and the HDD-B 114 and setting the logical addresses of the HDD-B 114 to the subsequent addresses, it is possible to set logical addresses to the region other than the two HDDs.

Figure 11:
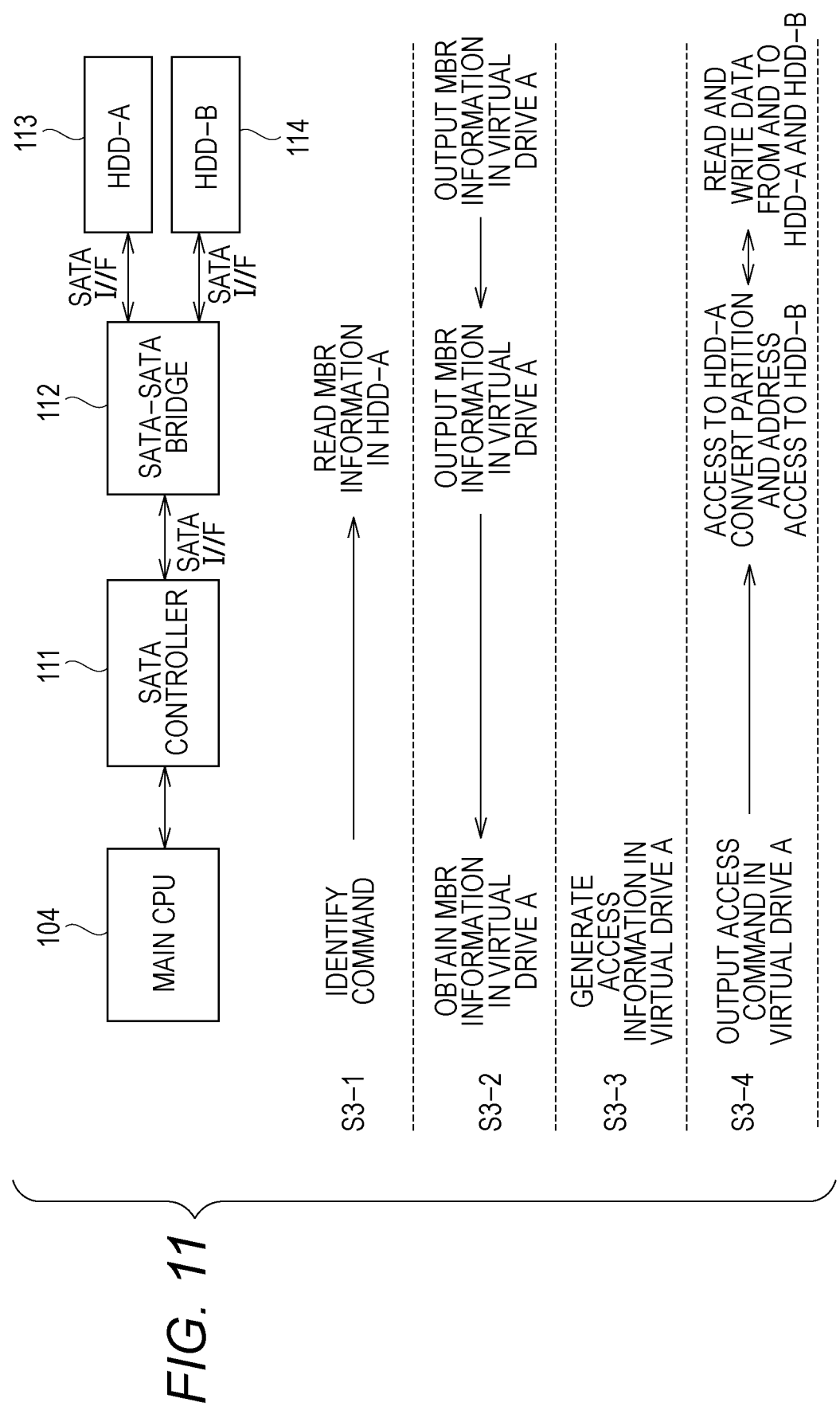
FIG. 11 is a diagram for describing data passing in S3.

The data passing in S3 will be described with reference to FIG. 11.

S3 is a control at the time of, after completion of S2, rebooting or power-on after power-off of the main CPU 104 and the SATA system in the present embodiment.

At this time, based on the information in the virtual drive generated in S2, the main CPU 104 generates access information to the HDD based on the general-purpose OS. Accordingly, data passing to and from the HDD-A 113 and the HDD-B 114 becomes enabled without making changes to the software of the general-purpose OS.

Hereinafter, S3 will be described in detail.

When the SATA system in the present embodiment is powered on, the general-purpose OS to control the main CPU 104 is read from the FLASH ROM 116 to boot up the main CPU 104.

At this time, in the SATA-SATA bridge 112, the mode information in the FLASH memory-B 207 is checked if operations will be performed in the virtual drive mode set in S2.

After that, when having recognized that the SATA I/F will be used, in S3-1, the main CPU 104 first outputs the SATA standard command called identify command. The identify command is a command for the general-purpose OS to obtain information in the drive connected to the SATA I/F. The identify command is input into the SATA-SATA bridge 112 via the SATA controller. Upon receipt of the identify command, the SATA-SATA bridge 112 reads information from the MBR region 401 of the HDD-A 113.

In S3-2, the information in the MBR region 401 of the HDD-A 113 is output from the HDD-A 113 and read into the SATA-SATA bridge 112. Then, the information is input into the main CPU 104 via the SATA controller 111.

At this time, as the MBR information in the virtual drive A as described above in relation to S2, the information for the HDD-A 113 and HDD-B 114 as illustrated in FIG. 9 to be recognized as one drive is already stored in S2 in the MBR region 401 of the HDD-A 113. Accordingly, the MBR information in the virtual drive A is input into the main CPU 104.

In S3-3, upon receipt of the MBR information in the virtual drive A as the information in the MBR region 401 of the HDD-A 113 under control of the general-purpose OS, the main CPU 104 selects the file system to be used and generates access information for transmitting and receiving data to and from the partitions in the virtual drive A based on the information. Upon completion of generation of the access information, transmission and reception of data between the main CPU 104 and the virtual drive A becomes enabled.

Next, access to the HDDs by using the access information in the virtual drive A will be described in detail below.

In S3-4, to make access to the virtual drive A, the main CPU 104 outputs a data read command or a data write command. At that time, the SATA-SATA bridge 112 uses the partition conversion information and the address conversion information stored in the FLASH memory-B 207 as necessary to access the HDD-A 113 or the HDD-B 114. The data read command and the data write command are examples of access commands.

In the access information in the virtual drive A, out of the addresses of the partitions in the virtual drive A, the addresses of the first partition 902 on the HDD-A 113 side are 0x0200h to 0x03FFh. The addresses of the second partition 903 are 0x0400h to 0x05FFh.

The addresses of the third partition 905 on the HDD-B 114 side are 0x0800h to 0x09FFh, and the addresses of the second partition 903 are 0x0A00h to 0x0BFFh.

Accordingly, for the main CPU 104 to transmit and receive data to and from the third and fourth partitions in the virtual drive A, the main CPU 104 specifies the addresses of the third and fourth partitions under control of the general-purpose OS and outputs the data read command and the data write command.

Upon receipt of the commands from the SATA controller 111, the SATA-SATA bridge 112 already recognizes that operations will be performed in the virtual drive mode. Accordingly, to make access from the SATA controller 111 to the third and fourth partitions on the HDD-B 114 side, the SATA-SATA bridge 112 converts the received partition addresses into the partitions and addresses on the HDD-B 114 side to access the HDD-B 114.

At this time, for conversion of the access information in the SATA-SATA bridge 112, the partition conversion information and the address conversion information stored in S2 in the FLASH memory-B 207 are used.

For example, upon receipt of a command for data write to the third partition 905 at the address 0x0800h on the HDD-B 114 side from the SATA controller 111, the SATA-SATA bridge 112 performs a conversion into the first partition at the address 0x0200h in the HDD-B 114 and stores the data in the HDD-B 114.

Accordingly, on the assumption that the virtual drive A is used as one drive without making any software change to the general-purpose OS, data passing between the main CPU 104 and the HDD-A 113, and between the main CPU 104 and HDD-B 114 becomes enabled by using the general-purpose OS.

Next, operations for causing the two drives HDD-A 113 and HDD-B 114 to be treated as one virtual drive by the general-purpose OS at the time of power-on will be described with reference to the flowcharts in FIGS. 12 to 17.

Figure 12:
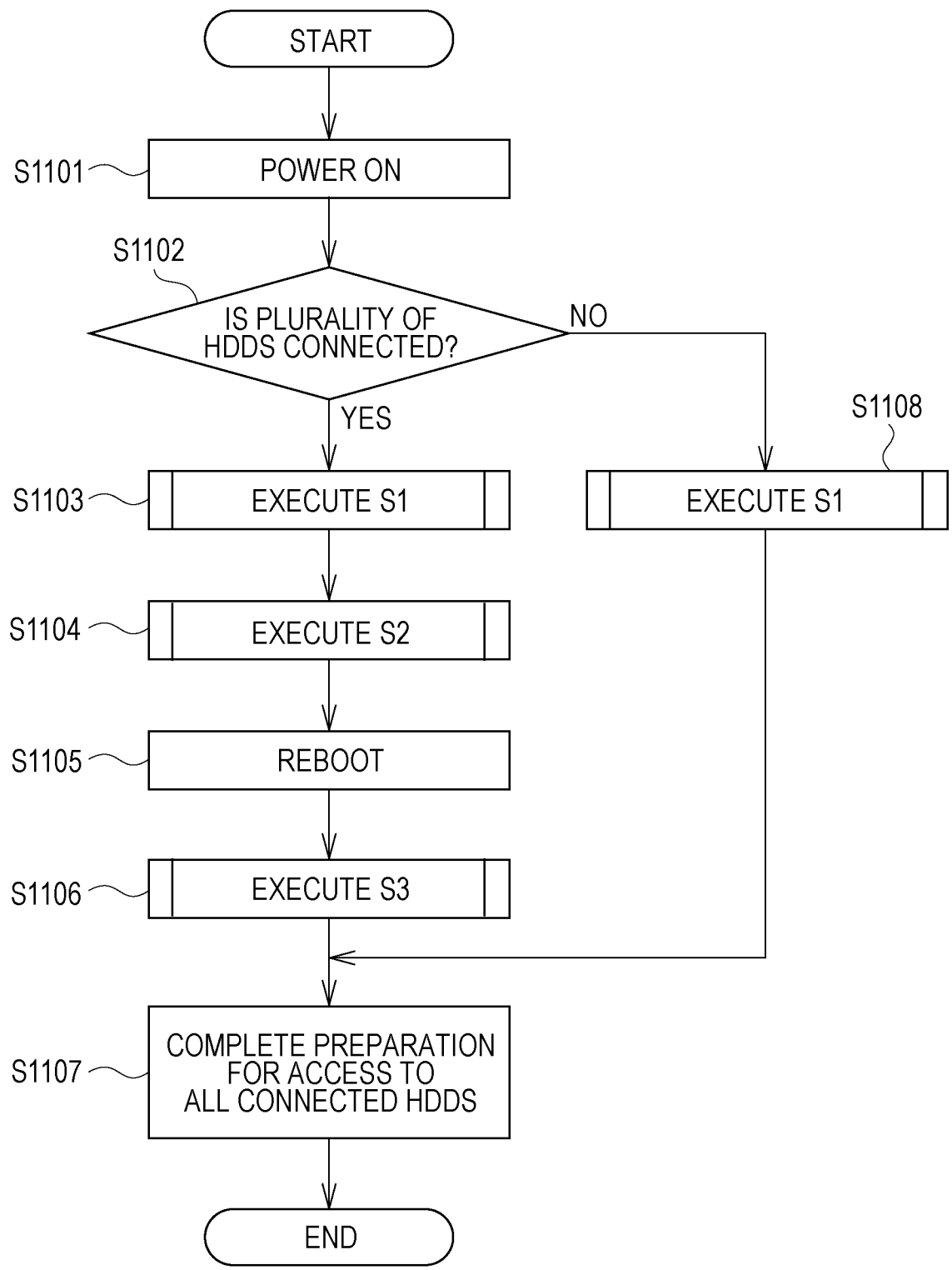
FIG. 12 is a flowchart of an example of information processing.

The flowchart in FIG. 12 describes a rough flow from the instant at which the SATA system in the present embodiment is powered on for the first time to the instant at which the main CPU 104 becomes capable of accessing the HDDs connected to the SATA system.

In S1101, the main CPU 104 first detects the power-on.

In S1102, the main CPU 104 determines whether one or more HDDs are connected to the SATA system from the information from the mounted substrate and others. When a plurality of HDDs is connected (Yes in S1102), the main CPU 104 moves to S1103, and when a plurality of HDDs is not connected (No in S1102), the main CPU 104 moves to S1108.

Figure 13:
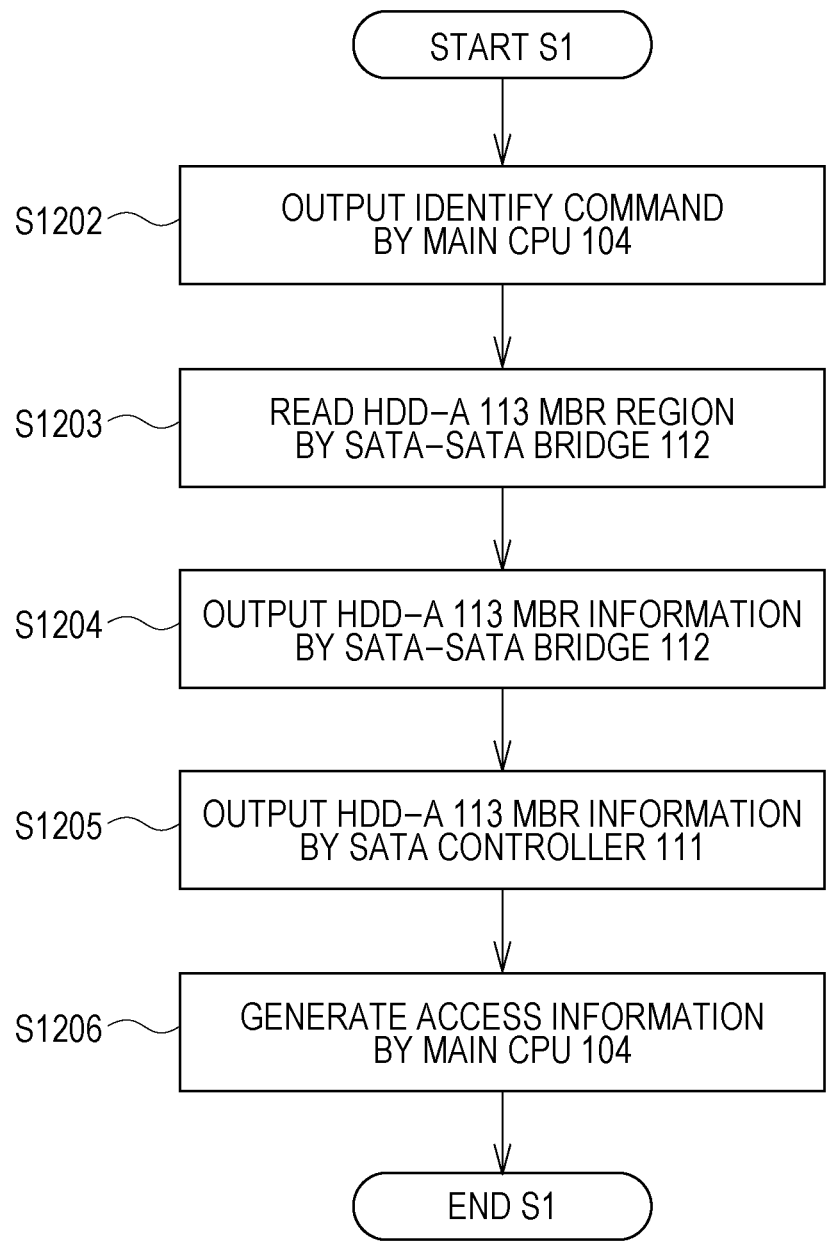
FIG. 13 is a flowchart of an example of processing in S1.

In S1103, the main CPU 104 and others perform the operation in S1. As a result, the system is started only by connection with the HDD-A 113. FIG. 13 describes the details of S1.

Subsequently, in S1104, the main CPU 104 and others generate the MBR information in the virtual drive A and stores the same in the HDD-A 113 as S2.

In S1105, the main CPU 104 executes rebooting.

As startup by rebooting and power-on after power-off, in S1106, the main CPU 104 and others perform S3.

Upon completion of S3, in S1107, the main CPU 104 can access the virtual drive A for data read and data write such that the plurality of drives can be collectively treated. The main CPU 104 terminates the process in the flowchart of FIG. 12.

Meanwhile, in S1108, the main CPU 104 and others perform S1. FIG. 13 describes the details of S1.

When the process proceeds from S1108 to S1107, the preparation for access to one connected HDD is completed to start the system.

The flow process performed by executing S1 (S1103) described in FIG. 12 will be explained in detail with reference to FIG. 13.

When the control of S1 is started, in S1202, the main CPU 104 outputs the SATA standard command called identify command.

This is the first-time power-on and thus the operation mode in the FLASH memory-B 207 in the SATA-SATA bridge 112 is set to the single drive mode.

In S1203, upon receipt of the identify command via the SATA controller 111, the CPU-B 204 in the SATA-SATA bridge 112 reads information from the MBR region 401 of the HDD-A 113.

In S1204, the CPU-B 204 outputs the MBR information in the HDD-A 113 via the SATA device I/F unit 201.

In S1205, upon receipt of the MBR information in the HDD-A 113, the CPU-C210 in the SATA controller 111 outputs the MBR information in the HDD-A 113 from the bus bridge circuit 212.

In S1206, upon receipt of the MBR information in HDD-A 113, the main CPU 104, under control of the general-purpose OS, selects the file system to be used and generates access information for transmitting and receiving data to and from the partitions in the HDD-A 113 based on the MBR information in the HDD-A 113.

Upon completion of generation of the access information, transmission and receipt of data between the main CPU 104 and the HDD-A 113 becomes enabled and the control of S1 is terminated.

Figure 14:
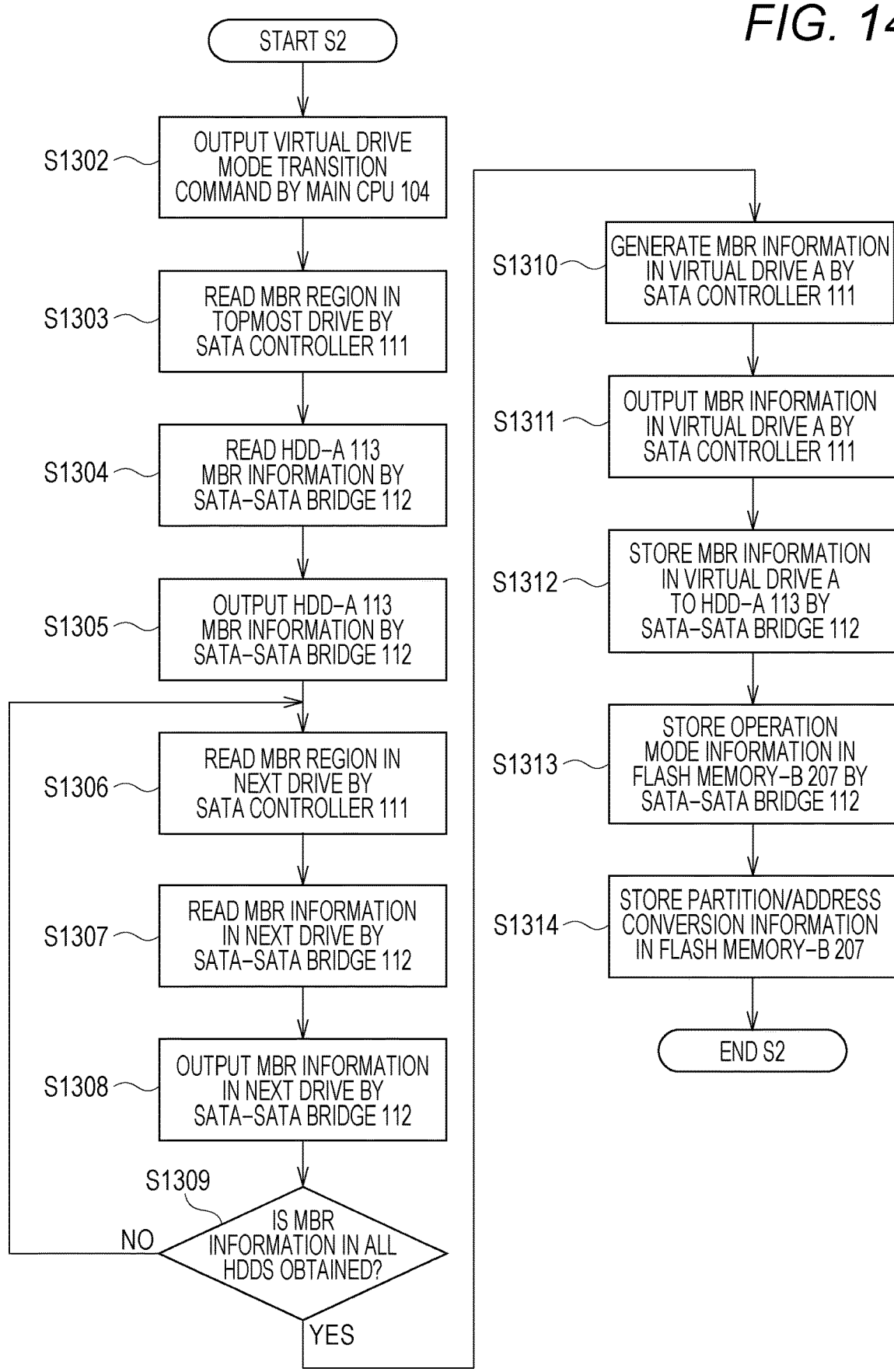
FIG. 14 is a flowchart of an example of processing in S2.

The flow process performed by executing S2 (S1104) described in FIG. 12 will be explained in detail with reference to FIG. 14.

In S2, upon completion of S1, the SATA controller 111 and the SATA-SATA bridge 112 are controlled to generate and store information in a virtual drive to be used at the next and subsequent times of startup.

When the control of S2 is started, in S1302, the main CPU 104 outputs the virtual drive mode transition command as a unique extended command of the SATA system.

Upon receipt of the virtual drive mode transition command, in S1303, the CPU-C 210 in the SATA controller 111 sends an order for reading the MBR information on the top-level drive out of the HDD drives connected to the SATA-SATA bridge 112.

In S1304, upon receipt of input of the order for reading the MBR information, the CPU-B 204 in the SATA-SATA bridge 112 reads the MBR information in the HDD-A 113 as the top-level drive.

In S1305, the CPU-B 204 in the SATA-SATA bridge 112 outputs the MBR information in the HDD-A 113 to the SATA controller 111.

In S1306, the CPU-C 210 in the SATA controller 111 sends an order for reading the MBR information in the next HDD drive connected to the SATA-SATA bridge 112.

In S1307, upon receipt of input of the order for reading the MBR information, the CPU-B 204 in the SATA-SATA bridge 112 reads the MBR information in the HDD-B 114.

In S1308, the CPU-B 204 outputs the MBR information in the HDD-B 114 to the SATA controller 111.

In S1309, the CPU-C 210 in the SATA controller 111 determines whether the MBR information in all the HDDs connected to the SATA system has been read or not. When the MBR information in all the HDDs connected to the SATA system has been read, the CPU-C 210 moves to S1310. When the MBR information in all the HDDs connected to the SATA system has not yet been read, the CPU-C 210 sends an order for reading the MBR information in the next HDD drive connected to the SATA-SATA bridge 112 and moves to S1306.

In S1310, the CPU-C 210 generates the MBR information in the virtual drive A as illustrated in FIG. 9.

After completion of generation of the MBR information in the virtual drive A, in S1311, the CPU-C 210 outputs to the SATA-SATA bridge 112 the MBR information in the virtual drive A together with the order for storing the MBR information in the virtual drive A in the HDD-A 113.

In S1312, upon receipt of the order for storing the MBR information in the virtual drive A in the HDD-A 113 and the MBR information in the virtual drive A, the CPU-B 204 in the SATA-SATA bridge 112 writes the MBR information in the virtual drive A in the MBR region of the HDD-A 113.

In S1313, after completion of storage of the MBR information in the virtual drive A, the CPU-B 204 stores information for performing operations in the virtual device mode in the FLASH memory-B 207 in the SATA-SATA bridge 112. Operations are performed in the virtual device mode when the power is turned on next time or when the SATA system in the present embodiment is rebooted.

In S1314, the CPU-B 204 stores the partition conversion information and the address conversion information in the FLASH memory-B 207.

Upon completion of storage of the partition conversion information and the address conversion information, S2 is terminated.

Figure 15:
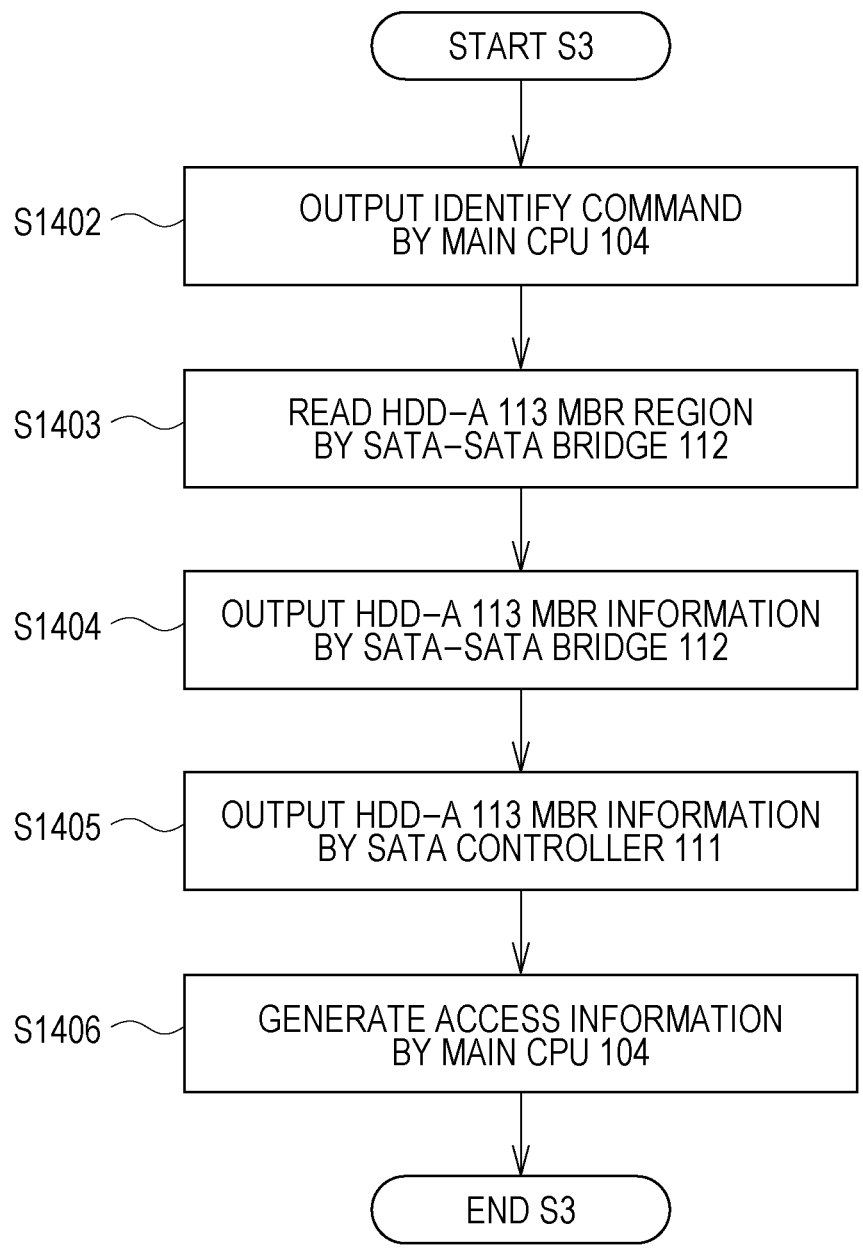
FIG. 15 is a flowchart of an example of processing in S3.

Next, the flow process performed by executing S3 (S1106) described in FIG. 12 will be described in detail with reference to FIG. 15.

S3 is a control at the time of, after completion of S2, rebooting or power-on after power-off of the main CPU 104 and the SATA system in the present embodiment.

At this time, based on the information in the virtual drive generated in S2, the main CPU 104 generates access information to the HDD under control of the general-purpose OS.

Accordingly, data passing to and from the HDD-A 113 and the HDD-B 114 becomes enabled without making changes to the software of the general-purpose OS.

When the control of S3 is started, in S1402, the main CPU 104 outputs the SATA standard command called identify command.

In this case, since S2 has been already executed, the operation mode is set to the virtual device mode in the FLASH memory-B 207 in the SATA-SATA bridge 112. In S1403, upon receipt of the identify command via the SATA controller 111, the CPU-B 204 in the SATA-SATA bridge 112 reads information from the MBR region 401 of the HDD-A 113.

At this time, as the MBR information in the virtual drive A as described above in relation to S2, the information for the HDD-A 113 and HDD-B 114 as illustrated in FIG. 9 to be recognized as one drive is already stored in the MBR region 401 of the HDD-A 113.

Therefore, the MBR information in the virtual drive A is input into the main CPU 104.

In S1404, the CPU-B 204 outputs the MBR information in the virtual drive A from the SATA device I/F unit 201.

Upon receipt of the MBR information in the virtual drive A, in S1405, the CPU-C 210 in the SATA controller 111 outputs the MBR information in the virtual drive A from the bus bridge circuit 212.

After receiving the MBR information in the virtual drive A, in S1406, under control of the general-purpose OS, the main CPU 104 selects the file system to be used and generates access information for transmitting and receiving data to and from the partitions of the MBR information in the virtual drive A based on the MBR information in the virtual drive A.

Upon completion of generation of the access information, transmission and receipt of data between the main CPU 104 and the virtual drive A becomes enabled and the control of S3 is terminated.

Figure 16:
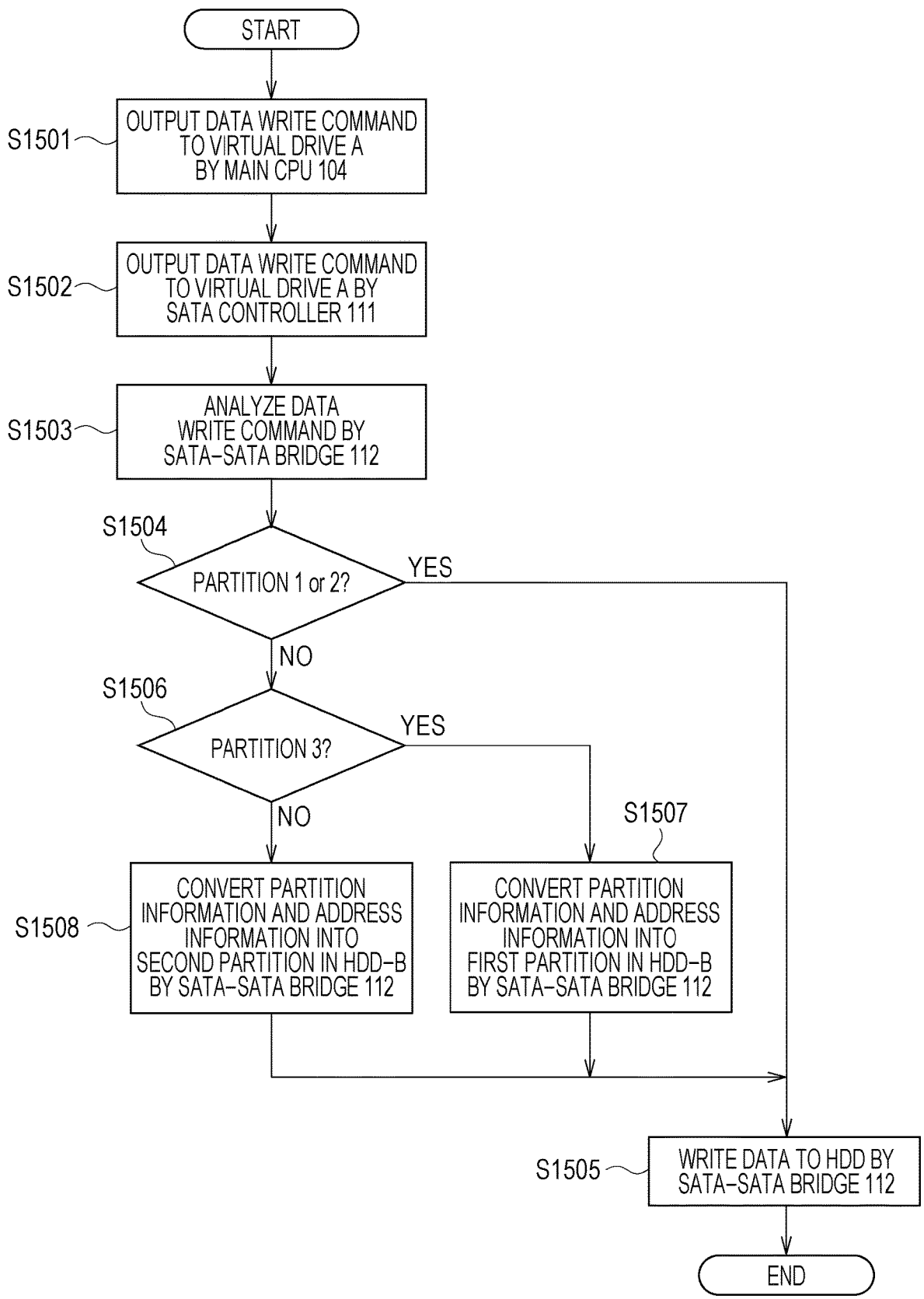
FIG. 16 is a flowchart of an example of processing for data write access.

FIG. 16 is a flowchart of operations for making data write access to the HDD in the virtual device mode.

In S1501, the main CPU 104 outputs the data write command to the virtual drive A.

Upon receipt of the data write command, in S1502, the CPU-C 210 in the SATA controller 111 outputs to the SATA-SATA bridge 112 the data write command to the virtual drive A from the main CPU 104.

After input of the data write command, in S1503, the CPU-B 204 in the SATA-SATA bridge 112 analyzes the contents of the data write command.

In S1504, as a result of the analysis, the CPU-B 204 determines whether the partition to be written is the first or second partition or any other partition. When the partition to be written is the first or second partition, the CPU-B 204 moves to S1506, and in another case, the CPU-B 204 moves to S1505.

After moving from S1504 to S1505, in S1505, the CPU-B 204 makes HDD data write access to the HDD-A 113 with the partition information and the address information kept intact.

In S1506, the CPU-B 204 determines whether the partition to be written is the third partition or not. When the partition to be written is the third partition, the CPU-B 204 moves to S1507, and when the partition to be written is the fourth partition, the CPU-B 204 moves to S1508.

In S1507, the CPU-B 204 converts the MBR information to the first partition information in the HDD-B 114 and also converts the address information.

After moving from S1507 to S1505, in S1505, the CPU-B 204 makes HDD data write access to the HDD-B 114 based on the partition information and the address information.

In S1508, the CPU-B 204 converts the MBR information to the second partition information in the HDD-B 114 and also converts the address information.

After moving from S1508 to S1505, in S1505, the CPU-B 204 makes HDD data write access to the HDD-B 114 based on the partition information and the address information.

The processing in S1507 or S1508 is an example of a process for, when the storage device as an access destination is a storage device other than the first storage device, converting the partition information and the address information relating to the access command into the partition information and the address information of the storage device as an access destination. The HDD-A 113 is an example of the first storage device. The HDD-B 114 is an example of a storage device other than the first storage device.

Figure 17:
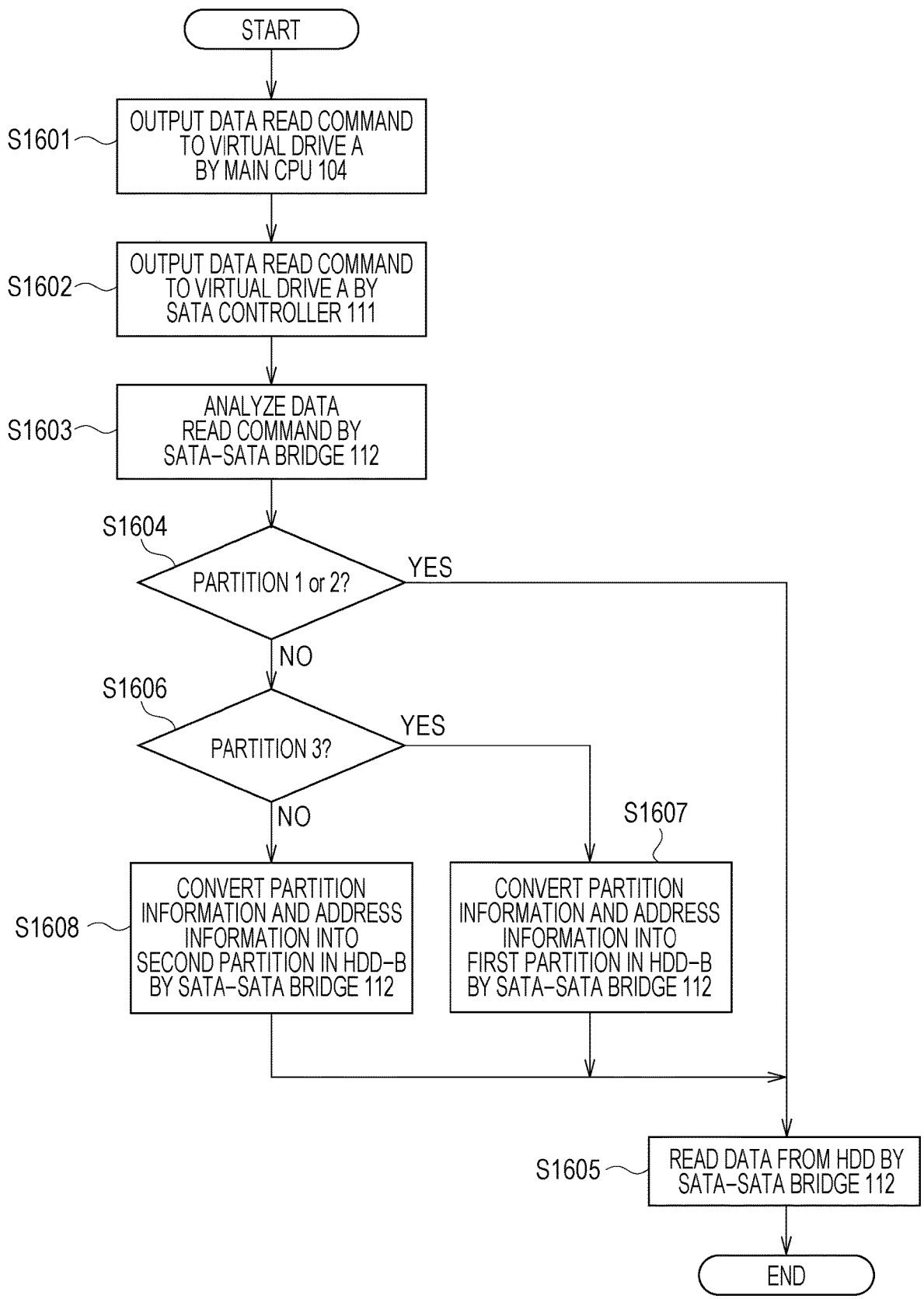
FIG. 17 is a flowchart of an example of processing for data read access.

FIG. 17 is a flowchart of operations for making data read access to the HDD in the virtual device mode.

In S1601, the main CPU 104 outputs the data read command to the virtual drive A.

After receipt of the data read command, in S1602, the CPU-C 210 in the SATA controller 111 outputs to the SATA-SATA bridge 112 the data read command to the virtual drive A from the main CPU 104.

After input of the data read command, in S1603, the CPU-B 204 in the SATA-SATA bridge 112 analyzes the contents of the data read command.

In S1604, as a result of the analysis, the CPU-B 204 determines whether the partition to be read is the first or second partition or any other partition. When the partition to be read is the first or second partition, the CPU-B 204 moves to S1605, and in another case, the CPU-B 204 moves to S1606.

After moving from S1604 to S1605, in S1605, the CPU-B 204 makes HDD data read access to the HDD-A 113 with the partition information and the address information kept intact.

In S1606, the CPU-B 204 determines whether the partition to be read is the third partition or not. When the partition to be read is the third partition, the CPU-B 204 moves to S1607, and when the partition to be read is the fourth partition, the CPU-B 204 moves to S1608.

In S1607, the CPU-B 204 converts the MBR information to the first partition information in the HDD-B 114 and also converts the address information.

After moving from S1607 to S1605, in S1605, the CPU-B 204 makes HDD data read access to the HDD-B 114 based on the partition information and the address information.

In S1608, the CPU-B 204 converts the MBR information to the second partition information in the HDD-B 114 and also converts the address information.

After moving from S1608 to S1605, in S1605, the CPU-B 204 makes HDD data read access to the HDD-B 114 based on the partition information and the address information.

The data read by the SATA-SATA bridge 112 through the HDD read access is transmitted as it is to the main CPU 104 via the SATA controller 111 as with the read data in the case where only one HDD is connected. The main CPU 104 receives the data as the read data from the virtual drive A.

Accordingly, on the assumption that the virtual drive A is used as one drive without making any software change to the general-purpose OS, data passing between the main CPU 104 and the HDD-A 113, and between the main CPU 104 and HDD-B 114 becomes enabled under control of the general-purpose OS.

In the present embodiment, the drives connected to the SATA-SATA bridge 112 are only HDDs. However, the drives to be connected are not limited to HDDs but any other recording devices such as SSDs can be processed in the same manner as far as these devices operate under the SATA protocol.

In the present embodiment, the number of the drives connected to the SATA-SATA bridge 112 is two. However, even when more than two drives are connected, the plurality of drives can access the HDD as one virtual drive as in the present embodiment, by storing the MBR information corresponding to the plurality of drives in the MBR region of the top-level drive.

An example of the exemplary embodiment of the present disclosure has been described so far in detail but the present disclosure is not limited to the specific exemplary embodiment.

For example, as a hardware configuration of the image forming apparatus 101, there may exist a plurality of main CPUs so that the plurality of main CPUs executes processing based on the programs stored in the DRAM 105 or the FLASH ROM 116. In addition, as a hardware configuration of the image forming apparatus 101, instead of the CPU, a graphics processing unit (GPU) may be used.

According to the present exemplary embodiment, it is possible to access a plurality of storage devices by using a general-purpose OS. That is, according to the technique described in Japanese Patent Laid-Open No. 5-298030, the controller and the drives are individually connected to each other and thus it is not possible to support the connection of the plurality of drives in the case where there is only one SATA I/F on the controller side. In addition, according to the technique described in Japanese Patent Laid-Open No. 5-298030, the logical drive names are unified and the method for rewriting the setting files and others are described based on the MS-DOS system, and it is thus not possible to support the SATA protocol in the same manner. According to the present exemplary embodiment, it is possible to eliminate at least one of these problems.

According to the exemplary embodiments described above, a general-purpose OS can be used as it is to enable access to a plurality of storage devices.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-011648, filed Jan. 26, 2018, which is hereby incorporated by reference herein in its entirety.

What is claimed is:

1. An information processing apparatus comprising:
    a controller configured to control a plurality of storage devices and transmit and receive data to and from the plurality of storage devices; and
    a bridge configured to communicate with the controller via a predetermined interface, communicate with each of the plurality of storage devices via each of a plurality of predetermined interfaces, and bridge the communications between the controller and the plurality of storage devices,
    wherein
    the bridge acquires information of a master boot record from each of the plurality of storage devices, and generates information of a master boot record in a virtual storage device to provide the plurality of storage devices as one storage device, and
    the bridge controls a process for writing the information of the master boot record in the virtual storage device into a region of a master boot record in a first storage device among the plurality of storage devices.

2. The information processing apparatus according to claim 1, further comprising a main central processing unit (CPU) configured to control the entire information processing apparatus, wherein
    the main CPU acquires the information of the master boot record in the virtual storage device stored in the region of the master boot record in the first storage device via the controller, and generates access information of the virtual storage device based on the information of the master boot record in the virtual storage device.

3. The information processing apparatus according to claim 2, wherein, upon receipt of a virtual drive mode transition command from the main CPU, the controller acquires the information of the master boot record from each of the plurality of storage devices, and generates the information of the master boot record in the virtual storage device.

4. The information processing apparatus according to claim 2, wherein, upon receipt of an access command to the virtual storage device from the main CPU, the bridge determines to which of the plurality of storage devices the access is to be made based on the access command, and when the storage device as an access destination is a storage device other than the first storage device, the bridge converts partition information and address information relating to the access command into partition information and address information in the storage device as the access destination.

5. The information processing apparatus according to claim 1, wherein the predetermined interface is a Serial Advanced Technology Attachment (SATA) interface.

6. The information processing apparatus according to claim 1, wherein the plurality of predetermined interfaces is a plurality of Serial Advanced Technology Attachment (SATA) interfaces.

7. The information processing apparatus according to claim 1, wherein the information processing apparatus is an image forming apparatus.

8. A control method of an information processing apparatus including:
   a controller configured to control a plurality of storage devices and transmit and receive data to and from the plurality of storage devices; and
   a bridge configured to communicate with the controller via a predetermined interface, communicate with each of the plurality of storage devices via each of a plurality of predetermined interfaces, and bridge the communications between the controller and the plurality of storage devices, the control method comprising:

by the bridge, acquiring information of a master boot record from each of the plurality of storage devices, and generating the information of a master boot record in a virtual storage device to provide the plurality of storage devices as one storage device; and by the bridge, controlling a process for writing the information of the master boot record in the virtual storage device into a region of a master boot record in a first storage device among the plurality of storage devices.

* * * * *